March 22, 1932.     A. J. WIEGAND     1,850,365
LIGHT DIFFUSING DEVICE
Filed Dec. 11, 1929

A. J. WIEGAND,
INVENTOR.
BY Sterling P. Buck,
ATTORNEY.

Patented Mar. 22, 1932

1,850,365

UNITED STATES PATENT OFFICE

ANDREW J. WIEGAND, OF BALTIMORE, MARYLAND

LIGHT DIFFUSING DEVICE

Application filed December 11, 1929. Serial No. 413,280.

This invention relates to light diffusing devices, and especially to an improved translucent front wall member for a headlight of an automobile or other vehicle.

The main object of this invention is to provide a device of this character which diffuses the light rays by finely dividing them, and slightly deflecting the fine divisions of the rays in such manner as to effectually eliminate the glare which is so well known as an objectionable and dangerous obstacle in the driving of automobiles and other vehicles.

A further object is to provide a device of this character which, while diffusing or softening the projected rays of light, does not obstruct such rays in the manner or to the extent that they are obstructed by other known inventions of a somewhat similar character.

Another object is to provide a device of this character which is formed of few, simple and comparatively inexpensive parts, and capable of being manufactured at a comparatively low cost.

Other objects and important features are pointed out or implied in the following details of description, in connection with the accompanying drawings in which.

Referring to these drawings in detail in which similar reference characters correspond to similar parts in the several views, the invention is now described in detail as follows.

Figures 3, 4:
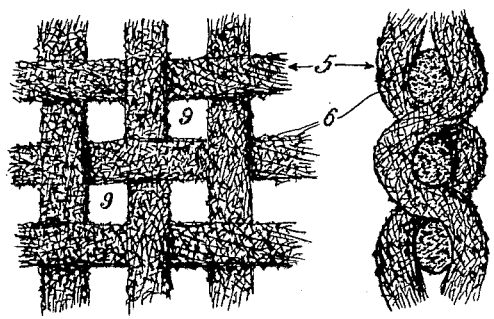
Figure 3 is a greatly enlarged view of a fragment of the woven fabric covered with a crystalline chemical or substance which preserves the fabric, increases its translucence, and deflects and reflects the divided rays of light which pass through the threads and through the small openings between the threads.
Figure 4 is an edge view of the structural section as shown in Figure 3.

A sheet of woven fabric 5, which is preferably very fine silk, and which has minute openings through it, is impregnated by dipping it into a solution of crystalline material which may be sodium chloride, Epsom salts, saltpeter or other material which impregnates the strands of fabric and also forms the crystallized coating such as indicated by the angular particles such as shown at 6 in Figures 3 and 4. This fabric is cut into form of the size desired for forming a part of the front wall or lens of a headlight for an automobile or other vehicle, and its peripheral edge is saturated with glue, paste, cement or other appropriate material, as indicated at 7, and placed against and between the two pieces of glass 8 of the same diameter. By means of the adhesive substance 7, the glass discs 8 and the fabric 5 are caused to adhere and unite so as to form a complete unit which constitutes the front wall or diffusing lens of the headlight.

Figure 1:
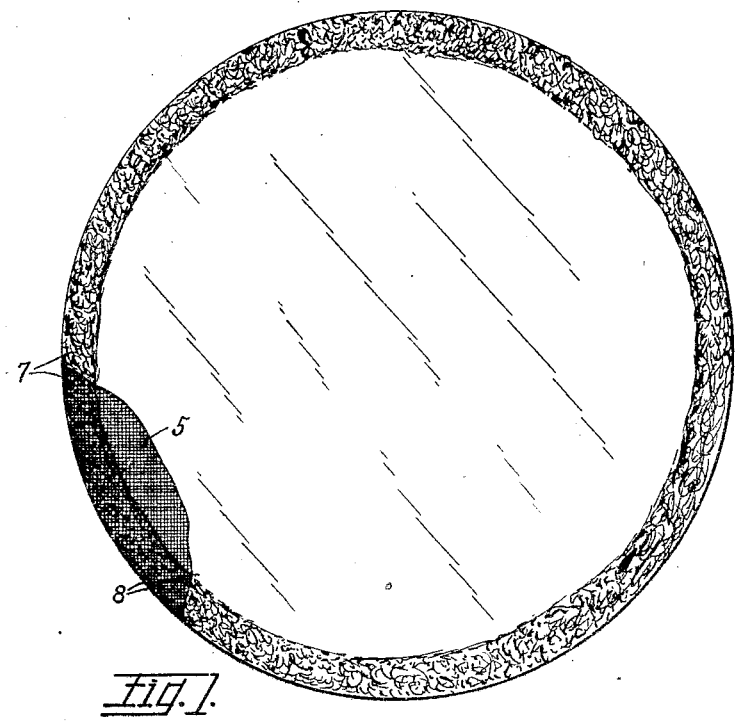
Figure 1 is a front elevation of a diffusing screen constructed in accordance with this invention, a part being broken off to show a part of the woven fabric and the means for securing it to the transparent plates between which it is secured.
Figure 2:
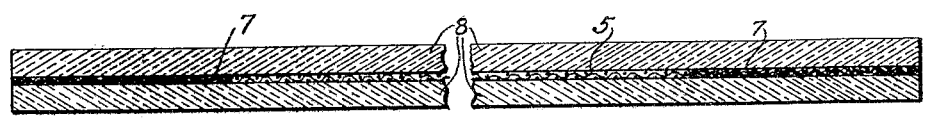
Figure 2 is a greatly enlarged sectional view showing opposite edges of a device such as shown in Figure 1, and parts of the intermediate portion, the greater part of said intermediate portion being broken out.

In Figure 1, the adhesive substance 7 is applied only on the peripheral edges of the plates and sheet, as indicated, giving a cloudy effect to the peripheral edge portion of the unit or front wall, but seen through the transparent plates 8 and through the interstices or foraminæ of the fabric sheet. In practice, the intermediate or main part of the fabric sheet is not clearly visible through the transparent plates 8, except upon close scrutiny, so no attempt has been made to show this fabric sheet through the transparent plates; and it should be understood, moreover, that such interstices or foraminæ are necessarily exaggerated as to their size, while the opposite is true with respect to their number.

It is recognized that somewhat similar devices have been previously invented and patented; but it should be understood that this present device distinguishes from the others in at least two respects; (1) The fabric has small light openings through it, as shown in Figures 1 and 3, inasmuch as the crystallized coating 6 does not close the interstices or foraminæ, but provides the strands with light-reflecting and light-refracting crystals, so that the light rays are separated or divided into minute beams which cross and recross one another so as to diffuse and soften the light which passes through this crystal-treated sheet of fabric; (2) the intermediate main part of the device is free from glue and the like, and does not adhere to either of the transparent plates; in contradistinction to the previously known devices which have the fabric saturated with a material which adheres to the glass plates and combines therewith to form a unit which does not permit the light rays to pass freely and unobstructedly therethrough. In other words, the previously known devices are entirely of the nature shown at the clouded edge portion 7, whereas, this clouded edge portion of applicant's device is as narrow as possible for securely uniting the parts to one another.

In addition to the functions previously mentioned for the crystalline substance, it protects the strands and fabrics against any deteriorating effect of air or vapor confined between the glass plates 8.

Although I have described this embodiment of my invention specifically, it is not my intention to limit my patent protection to these exact details of construction, arrangement and materials; for the invention is susceptible of changes within the scope of the inventive ideas as implied and claimed.

What I claim for my invention is:

1. In a light-diffusing device, the combination of a sheet of fabric having open interstices, crystalline material impregnating said fabric and also forming a crystallized coating on the strands thereof while leaving the interstices open so as to provide very small light-openings through the fabric, two plates of transparent material, said fabric and crystalline material being inclosed between said plates, and means securing only the peripheral edges of said sheet of fabric to said plates of transparent material, the intermediate main parts of said sheet of fabric and transparent plates being disunited.

2. A light diffusing device comprising a transparent plate, a sheet of fabric, crystalline material impregnating the fabric and forming a coating of crystals thereon, said fabric being against said plate and having its peripheral edge secured thereto by adhesive material while its intermediate main part is free from adhesion to said plate, and transparent means on the impregnated sheet at the opposite side from said plate and cooperating with the latter for protecting the sheet and its coating.

In testimony whereof I affix my signature.

ANDREW J. WIEGAND.